United States Patent
Günzel

(10) Patent No.: US 11,810,149 B2
(45) Date of Patent: Nov. 7, 2023

(54) METHOD AND DEVICE FOR MONITORING A PASSENGER OF A VEHICLE

(71) Applicant: Volkswagen Aktiengesellschaft, Wolfsburg (DE)

(72) Inventor: Thorben Günzel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 173 days.

(21) Appl. No.: 17/415,925

(22) PCT Filed: Nov. 27, 2019

(86) PCT No.: PCT/EP2019/082819
§ 371 (c)(1),
(2) Date: Jun. 18, 2021

(87) PCT Pub. No.: WO2020/126376
PCT Pub. Date: Jun. 25, 2020

(65) Prior Publication Data
US 2022/0084061 A1    Mar. 17, 2022

(30) Foreign Application Priority Data
Dec. 21, 2018 (DE) ...................... 10 2018 133 453.2

(51) Int. Cl.
| | |
|---|---|
| *G06Q 30/00* | (2023.01) |
| *G06Q 30/0242* | (2023.01) |
| *G06V 20/59* | (2022.01) |
| *G06V 40/16* | (2022.01) |
| *B60W 40/08* | (2012.01) |

(Continued)

(52) U.S. Cl.
CPC ......... *G06Q 30/0242* (2013.01); *B60W 40/08* (2013.01); *G06Q 30/0266* (2013.01);
(Continued)

(58) Field of Classification Search
CPC .... G06V 20/59; G06V 40/174; G06V 40/171; G60W 40/08; G10L 15/08; G10L 25/63;
(Continued)

(56) References Cited

U.S. PATENT DOCUMENTS

| | | | |
|---|---|---|---|
| 8,978,086 B2 | 3/2015 | Bhatia et al. | 725/133 |
| 9,043,834 B2 | 5/2015 | Atsmon et al. | 725/34 |

(Continued)

FOREIGN PATENT DOCUMENTS

| | | | |
|---|---|---|---|
| CN | 107924523 A | 4/2018 | G06Q 30/02 |
| DE | 10033333 A1 | 1/2002 | G06Q 30/00 |

(Continued)

OTHER PUBLICATIONS

Chinese Office Action, Application No. 201980084892.9, 13 pages, dated Aug. 29, 2023.

*Primary Examiner* — Alvin L Brown
(74) *Attorney, Agent, or Firm* — Slayden Grubert Beard PLLC

(57) ABSTRACT

The invention relates to a method for monitoring a passenger of a vehicle in which it is detected if informational content perceptible in the vehicle is being output, and recognition data on output informational contents are recorded. The method provides that a conversation in the interior of the vehicle is recorded using a microphone in the interior of the vehicle, at least during or for a time interval after the outputting of the informational content, an analysis is performed of the recorded conversation that was held while or for a time interval after the informational content was output, and by using the conversation analysis and the recorded recognition data of the informational content output during or before the conversation, it is detected whether the output informational content was perceived by a passenger of the vehicle.

20 Claims, 1 Drawing Sheet

(51) Int. Cl.
  G06Q 30/0251 (2023.01)
  G10L 15/08 (2006.01)
  G10L 25/63 (2013.01)

(52) U.S. Cl.
  CPC ............ G06V 20/59 (2022.01); G06V 40/171 (2022.01); G06V 40/174 (2022.01); G10L 15/08 (2013.01); G10L 25/63 (2013.01); B60W 2540/21 (2020.02); B60W 2540/22 (2013.01); B60W 2540/225 (2020.02); B60W 2540/229 (2020.02); G10L 2015/088 (2013.01)

(58) Field of Classification Search
  CPC ...... G10L 2015/088; B60W 2540/225; B60W 2540/21; B60W 2540/229; B60W 2540/22
  See application file for complete search history.

(56) References Cited

U.S. PATENT DOCUMENTS

| | | |
|---|---|---|
| 10,970,747 B2 | 4/2021 | Miller et al. |
| 2007/0078730 A1 | 4/2007 | Serra et al. ................. 705/26.1 |
| 2012/0143693 A1 | 6/2012 | Chung et al. ............... 705/14.66 |
| 2014/0039788 A1 | 2/2014 | Fuehrer ........................ 701/400 |
| 2014/0214933 A1 | 7/2014 | Liu et al. ...................... 709/204 |
| 2014/0278910 A1 | 9/2014 | Visintainer et al. ....... 705/14.41 |
| 2014/0278933 A1 | 9/2014 | Mcmillan .................. 705/14.45 |
| 2014/0279021 A1 | 9/2014 | Macneille et al. .......... 705/14.63 |
| 2014/0379456 A1 | 12/2014 | Miller ........................ 705/14.41 |
| 2015/0142552 A1 | 5/2015 | Schmehl et al. ........... 705/14.41 |
| 2016/0316237 A1 | 10/2016 | Macneille et al. ............... 725/10 |
| 2019/0122661 A1* | 4/2019 | Hansen .................. G10L 15/22 |

FOREIGN PATENT DOCUMENTS

| | | | | |
|---|---|---|---|---|
| DE | 102004020878 A1 | | 11/2005 | ............ G06F 15/18 |
| DE | 102012213466 A1 | | 2/2014 | ........... B60W 30/08 |
| DE | 102014201457 A1 | | 7/2014 | ............ H04H 20/53 |
| DE | 102014204227 A1 | | 9/2014 | ............ B60R 16/02 |
| DE | 102014204530 A1 | | 9/2014 | ............ G06F 21/04 |
| DE | 102018133453 A1 | | 6/2020 | ............ G06F 40/20 |
| JP | 2002145067 A | * | 5/2002 | |
| JP | 2004226070 A | | 8/2004 | ............ G01C 21/00 |
| WO | 2020/126376 A1 | | 6/2020 | ............ G06Q 30/02 |

* cited by examiner

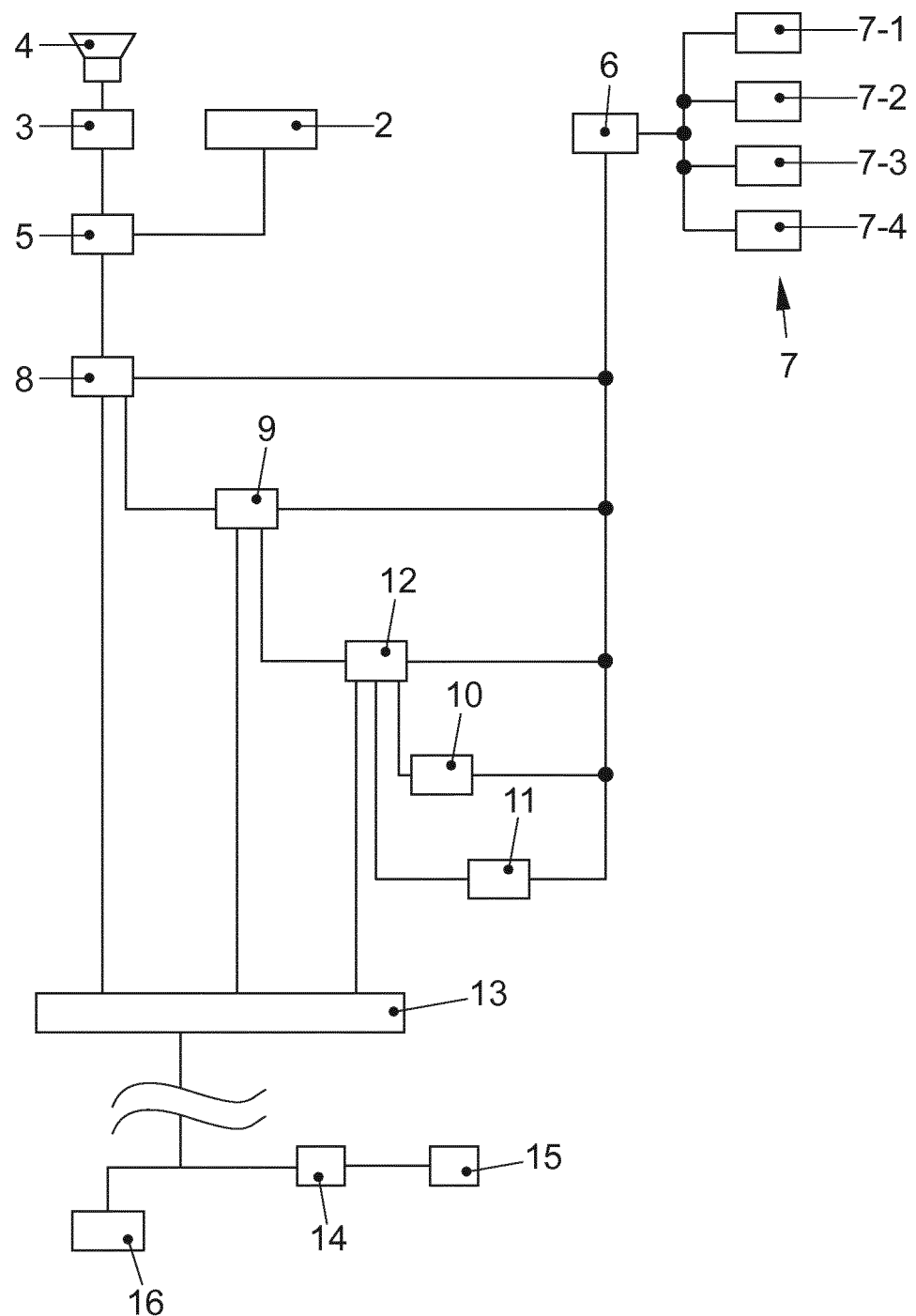

METHOD AND DEVICE FOR MONITORING A PASSENGER OF A VEHICLE

CROSS-REFERENCE TO RELATED APPLICATIONS

This application claims priority to German Patent Application No. DE 10 2018 133 453.2, filed on Dec. 21, 2018 with the German Patent and Trademark Office. The contents of the aforesaid Patent Application are incorporated herein for all purposes.

TECHNICAL FIELD

The present invention relates to a method for monitoring a passenger of a vehicle in which it is detected if informational content perceptible in the vehicle is output, and recognition data on output informational contents are recorded. Furthermore, the invention relates to a device for monitoring a passenger of a vehicle that has a detection device which is designed to detect if informational content perceptible in the vehicle is output. Furthermore, the device has a recognition apparatus for recording recognition data on output informational contents, and a microphone that is arranged in the interior of the vehicle and is designed to record a conversation in the interior of the vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Advertising contents, for example, are visually or auditorily output in a vehicle. It is in the interest of the advertising company to learn if the output advertising has been perceived by a passenger of the vehicle. This information can be obtained by monitoring the passengers of the vehicle.

SUMMARY

An object exists to provide a method and a device with which the vehicle passenger's perception of the outputting of informational content can be monitored.

The object is solved by a method and a device according to the independent claims. Embodiments of the invention are described in the dependent claims, the following description, and the drawings.

BRIEF DESCRIPTION OF THE DRAWING

FIG. 1 shows an exemplary embodiment of a device for monitoring a passenger of a vehicle.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first exemplary aspect, a method is provided wherein a conversation in the interior of the vehicle is recorded using a microphone in the interior of the vehicle, at least while the informational content is being output, or for a time interval after the informational content has been output. Subsequently, an analysis is performed of the recorded conversation that was held while, or for a time interval after, the outputting of the informational content, and it is detected whether the output informational content was perceived by a passenger of the vehicle using the conversation analysis and the recorded recognition data of the informational content output during or before the conversation.

The conversation may for example be between at least two passengers of the vehicle, or between at least one passenger and a caller, or between at least one passenger and a person outside of the vehicle, or a soliloquy by a passenger. The discussion below refer to all of the possibilities of a conversation in the interior of the vehicle.

The informational content is any form of information that is perceptible by a vehicle passenger. The informational content is for example advertising content. Advertising is therefore output, the content of which is perceptible by a passenger of the vehicle. The method according to the present aspect monitors the vehicle passenger as to whether he has perceived the advertising content. To accomplish this, the content of a conversation in the interior of the vehicle is analyzed. By using this conversation analysis, a relationship with the recognition data of the associated informational content may be established. If such a relationship exists, it is concluded that the informational content was perceived by a vehicle passenger. The conversation analysis allows the perception of informational content to be inferable in a very reliable matter.

The time interval after the informational content is output may for example comprise a time period of up to 30 minutes after concluding the outputting the informational content. The time interval comprises for example a time period of 20 minutes, 10 minutes, or 2 minutes, after concluding the outputting of the informational content.

The informational content may be output auditorily. Alternatively or in addition and in some embodiments, it may be output visually. The informational content may for example be displayed visually in the vehicle, or by an object in the traffic space outside of the vehicle so that it is perceptible within the vehicle. Furthermore, it may be acoustically output by a speaker.

In some embodiments, the recognition data are obtained by analyzing the output informational content. For example, visual output of the informational content may be recorded by an interior camera or a camera that records the environment of the vehicle. Auditory output may be recorded acoustically using an interior microphone. The data recorded by a camera and/or the interior microphone may then be analyzed in order to obtain recognition data for the informational content. In these embodiments, the recognition data may be obtained solely by apparatuses of the vehicle without it being necessary to access vehicle-external apparatuses.

In some embodiments, a device is detected which outputs the informational content. Data for identifying the detected device are then transmitted to a vehicle-external apparatus. By using the data for identifying the detected device, the vehicle-external apparatus detects the recognition data on the informational contents output by the device, and the detected recognition data are transmitted by the vehicle-external apparatus to the vehicle. In these embodiments, it is necessary to access vehicle-external apparatuses. In this case, the recognition data may however be obtained reliably and if applicable in a predetermined manner since the vehicle-external apparatus may have data on which informational content are output by the detected device at which time.

According to some embodiments, setting data are recorded on a setting of the device that outputs the informational content, and/or on the point in time or the time interval of the outputting the informational content. These setting data are transmitted to the vehicle-external apparatus which, by using the setting data, detects the recognition data on the informational contents output by the device. As a consequence, the vehicle-external apparatus may receive data on which informational content is output by a device when this device may output different informational contents at different settings.

The device may for example be a radio. The setting data may then indicate which radio station is outputting the informational content. The vehicle-external apparatus then detects which informational content was output at which point in time or time interval by the radio station, and which acoustic recognition data the output contained. For example, the vehicle-external apparatus may access a data memory which contains data on what wick radio station outputs when. Recognition data defined beforehand that are assigned to these information outputs may be saved, and may then be transmitted by the vehicle-external apparatus to the vehicle.

Alternatively, the informational content may be output by a vehicle-internal device in the interior of the vehicle independent of a set radio station. In this case, vehicle-internal data exist about the informational content which was output at which point in time, and about the recognition data which the output contained.

The recognition data may for example comprise keywords of the output informational content. As a consequence, a particularly reliable conversation analysis may be performed.

In some embodiments, the analysis of the recorded conversation that was held while or for a time interval after the informational content was output detects whether there is a correspondence between at least a subset of the keywords belonging to the informational content and words of the conversation. If words occur in the conversation that correspond to keywords of the informational content, it may be very reliably concluded that the conversation content is related to the output informational content. The keywords are therefore very special or very rarely occurring words in the informational content so that a clear delineation between a general conversation and a conversation about the output informational content is possible in the conversation analysis. In this manner, it may be particularly reliably detected if the monitored passenger has perceived the output informational content.

In some embodiments, the content of the conversation is detected and the reaction of at least one passenger to the informational content is determined in the analysis of the recorded conversation that was held during or for a time interval after the outputting of the informational content. It may for example be analyzed if the passenger has reacted positively, neutrally or negatively to the informational content. Beneficially in these embodiments, it may be detected not only if the output of the informational content has been perceived, but also what the reaction is to the informational content.

In some embodiments, the mood of the passenger is recorded by means of a mood recording apparatus at the point in time or time interval at which the informational content was output. To accomplish this, the mood recording apparatus may for example be coupled to an interior camera and/or a microphone. In this manner, the voice, the facial expressions and/or the gestures of the passenger may be analyzed and classified by the mood recording apparatus and thereby assigned to a certain mood.

Moreover, personal features of the passenger may be recorded. For example, the identity of the passenger, for example the driver of the vehicle, may be detected using the vehicle key, or using an input upon starting the trip.

Alternatively, the personal features of the passenger are recorded by means of a passenger recording apparatus. This may access an interior camera and/or a microphone. In this manner, the age class and the gender of the passenger may for example be detected automatically. This information may assist the further evaluation of the data on the perceptions of informational contents.

In some embodiments, a vehicle-internal analytical apparatus records which informational content was perceived, for example which informational content in the vehicle was perceived by which passenger and when. This saved data may be used in a later evaluation to determine the effectiveness of the output informational content, for example output advertising content.

Alternatively or in addition and in some embodiments, the vehicle-internal analytical device records which metadata are contained in the informational content. In outputting advertising content, this metadata may for example contain information on which product or which company was advertised. This metadata may moreover also be contained in the recognition data. The advertised product, or respectively the advertised company may also be keywords of the output informational content.

The vehicle-internal analytical apparatus may furthermore record which personal features and/or which mood the passenger had who perceived the informational content. Moreover, saving this additional data is beneficial for the subsequent evaluation of the effectiveness of outputting the informational content.

The data recorded by the analytical apparatus may for example be transmitted to a vehicle-external evaluation apparatus. This evaluation apparatus may receive the data from a plurality of vehicles and thereby perform a comprehensive and efficient evaluation of the effectiveness of the output informational content. Moreover, the vehicle-external evaluation apparatus may detect how informational content belonging to metadata is perceived by using the data from a plurality of vehicles.

According to a second exemplary aspect, a device is provided that has an analytical apparatus that is coupled to the microphone and is designed to analyze a conversation recorded by means of the microphone at least during or for a time interval after the outputting of the informational content, and to detect whether the output informational content was perceived by a vehicle passenger using the conversation analysis and the recorded recognition data of the informational content output during or before the conversation.

This device is designed for example to execute the method according to the first exemplary aspect or its embodiments, as discussed in the preceding.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

The device according to some embodiments is arranged in a vehicle 1. A passenger in a vehicle 1 can be monitored by means of the device. It comprises a display 2 for visually outputting informational content. Furthermore, the device comprises a radio 3 that is connected to a speaker 4 so that informational content can be output auditorily.

The informational content in the exemplary embodiment is advertising content. The advertising content may accordingly be output acoustically by means of the radio 3 over the speaker 4 and/or visually by means of the display 2. Recognition data and metadata are associated with the informational content. The recognition data are keywords that are related to the informational content. The keywords can be words that are visually displayed when the informational content is output on the display 2, or that occur in spoken text during the auditory output of the informational content. The recognition data, in particular the keywords, may however also be otherwise related to the informational content. It is not necessary that the keywords were displayed or output acoustically. The recognition data are in such a relationship with the informational content that, by using the recognition data, it can be detected if a user has perceived the output of the informational content. For example, the recognition data may also contain keywords which are related to the informational content in a figurative sense. For example, the keywords can be such that are spoken with a high probability in a conversation about the informational content without the keywords themselves occurring in the informational content. The keywords are chosen for example such that the frequency of occurrence of these words is minimal enough for the keywords to be mentioned with a low probability in another context.

The display 2 as well as the radio 3 are coupled to an information output apparatus 5. The information output apparatus controls information output by the display 2 and the radio 3. Moreover, setting data for the display 2 and the radio 3 are transmitted to the information output apparatus 5.

The device furthermore comprises a sensor apparatus 6 arranged in the vehicle 1 that is coupled to a plurality of sensors 7. The sensors 7 comprise for example an interior camera 7-1 that inter alia records a passenger of the vehicle 1, in particular the driver, and an environmental camera 7-2 that records images in the environment of the vehicle 1, for example in the direction of driving. Moreover, the sensors 7 comprise an interior microphone 7-3 that is arranged so that, in the interior of the vehicle 1, it can record conversations in the interior of the vehicle 1. Finally, the sensors 7 comprise an identification unit 7-4 by means of which a passenger of the vehicle 1 can be identified.

The information output apparatus 5 and the sensor apparatus 6 are connected to a detection apparatus 8. The detection apparatus 8 is designed to detect whether informational content perceptible in the vehicle 1 is being output. For example, the detection apparatus 8 can determine, by means of the information output apparatus 5, whether the radio 3 is turned on, or the information is being shown on the display. Alternatively or in addition and in some embodiments, the detection apparatus 8 can detect, by using the data of the sensors 7 transmitted by the sensor apparatus 6, whether specific informational content, for example advertising content, was output visually by means of the display 2 or auditorily by means of the radio 3 and the speaker 4 connected thereto.

Moreover, alternatively or in addition and in some embodiments, the detection apparatus 8 can be connected by a communication interface 13 to a vehicle-external apparatus 14 such as a server that in turn is coupled to a data memory 15. The data memory 15 can contain information on when specific informational content, for example advertising content, is being output when on which radio station. This information can be transmitted to the detection apparatus 8 via the communication interface 13. Via the information output apparatus 5, the radio 3 transmits the information as setting data on which radio station is currently being output. By using this information, the detection apparatus 8 can then determine when the informational content relevant to the monitoring of the passenger is being output. The information that relevant informational content is currently being output is transmitted by the detection apparatus 8 to a recognition apparatus by means of which recognition data on output informational content can be recorded. As explained above, the recognition data comprise keywords on output informational content. The recognition data can be obtained by means of the recognition apparatus 9 in various ways:

The recognition apparatus 9 is coupled to the sensor apparatus 6. The output informational content is recorded by the interior microphone 7-3. This recording is analyzed by the recognition apparatus 9. In doing so, the recognition data are extracted.

Alternatively or in addition and in some embodiments, the recognition apparatus 9 provides recognition data directly through the information output apparatus 5. For example while receiving a radio signal, additional information can be conveyed which the radio 3 transmits to the information output apparatus 5 which then provides this data to the recognition apparatus 9.

Finally, alternatively or in addition and in some embodiments, the recognition apparatus 9 is coupled to the communication interface 13 of the vehicle 1 that provides a connection to the external vehicle-external apparatus 14 and the data memory 15. By means of the information output apparatus 5, the recognition apparatus 9 detects the device by means of which the informational content is being output, i.e., in the present exemplary embodiments, whether the informational content is being output visually by the display 2 and/or auditorily by the speaker 4. The data for identifying the detected device are transmitted together with a timestamp to the vehicle-external apparatus 14. By using the data for identifying the detected device, the vehicle-external apparatus 14 detects the recognition data on the informational contents output by the device by calling data from the data memory 15. The data memory 15 can save not just which time which informational content was output by which radio station, but it can also save the assigned recognition data. In the same manner, the data memory 15 can also save corresponding recognition data on informational contents visually output by the display 2. For example, the display 2 can show visual advertising, for example in the context of a television program. The recognition data detected by the vehicle-external apparatus 14 are transmitted via the communication interface 13 to the recognition apparatus 9.

In addition to the recognition data, the recognition apparatus 9 can also record metadata on the output informational content. This metadata can overlap with the recognition data; it can however also contain additional information such as for example information on an advertised product or an advertised company.

The recognition apparatus 9 is connected to a vehicle-internal analytical apparatus 12. The analytical apparatus 12 is moreover coupled to the sensor apparatus 6. This transmits recordings by the interior microphone 7-3 to the analytical apparatus 12. The analytical apparatus 12 is designed to analyze a conversation recorded during the output of informational content, or for a time interval after the outputting of informational content. By using this conversation analysis and the recorded recognition data of the informational content output during or before the conversation, the analytical apparatus 12 detects whether the output informational content was perceived by a passenger of the vehicle 1. In doing so, the analytical apparatus 12 extracts for example words of the recorded conversation while the information is being output or in a time interval afterwards, and compares these extracted words to keywords of the recognition data. If a certain degree of correspondence is detected, the analytical apparatus 12 concludes that a vehicle passenger has perceived the output informational content. The information that specific informational content was perceived by a vehicle passenger is saved by the analytical apparatus 12 in an internal memory together with associated time information on the outputting of the informational content, as well as any setting data for the device for outputting the informational content.

Moreover, the analytical apparatus 12 is designed to detect the content of the conversation and to determine the reaction of at least one passenger to the informational content in the analysis of the recorded conversation that was held during or for a time interval after the outputting of the informational content. For example, it can be determined whether the reaction of the passenger to the informational content is positive, neutral or negative by using previously defined recognition words. This information is also saved internally by the analytical apparatus 12.

Moreover, the analytical apparatus 12 is connected to a mood recording apparatus 10. By using the mood recording apparatus 10, the current or respectively past mood of the passenger at the point in time or during the time interval at which the informational content was output is recorded. To accomplish this, the mood recording apparatus 10 is coupled to the sensor apparatus 6. For example, the facial expressions, the gestures and the voice of the passenger can be analyzed and assigned to a specific mood class.

Finally, the analytical apparatus 12 is connected to a passenger recording apparatus 11 which in turn is connected to the sensor apparatus 6. The passenger recording apparatus 11 can record personal features of the passenger using the data recorded by the sensors 7. On the one hand, the identity can be detected directly by the identification unit 7-4, for example using a key personally assigned to the passenger. Alternatively or in addition and in some embodiments, the personal features of the passenger may be detected by an image analysis and/or voice analysis. In so doing, data from the interior camera 7-1 and/or the interior microphone 7-3 can be evaluated.

The data obtained by the mood recording apparatus 10 and the passenger recording apparatus 11 are also saved by the analytical apparatus 12 in the internal memory. A data record is thereby saved in the analytical apparatus that indicates which informational content was perceived when in the vehicle 1 by which passenger, which personal features the passenger has, which metadata are contained in the informational content, and the mood of the passenger as he perceived the informational content. This data record is transmitted via the communication interface 13 or otherwise by the vehicle-internal analytical apparatus 12 to a vehicle-external evaluation apparatus 16. This evaluation apparatus 16 collects the data obtained from a plurality of monitorings of passengers of vehicles 1 and evaluates them in order to obtain data on the effectiveness of outputting the informational content. The vehicle-external evaluation apparatus moreover detects, by using the data from a plurality of vehicles, how informational content belonging to metadata is perceived.

In some embodiments, the informational content is not output visually or auditorily within the vehicle 1, but rather outside of the vehicle 1. For example, the informational content can be output by an object in the traffic space in which the vehicle 1 is moving. In this case as well, it can be detected by analyzing a conversation in the interior of the vehicle whether the informational content output outside of the vehicle 1 was perceived by a passenger of the vehicle 1. Outputting informational content is understood to mean inter alia varying display contents on a vehicle-external display. The informational content can however also be output by a stationary advertising poster or varying informational content. In this case, it is a stationary information display, such as by an advertising poster. If the vehicle 1 passes such an object in the traffic space, the conversation analysis detects whether a vehicle passenger has perceived this informational content.

LIST OF REFERENCE NUMERALS

1 Vehicle
2 Display
3 Radio
4 Speaker
5 Information output apparatus
6 Sensor apparatus
7 Sensors
7-1 Interior camera
7-2 Environmental camera
7-3 Interior microphone
7-4 Identification unit
8 Detection apparatus
9 Recognition apparatus
10 Mood recording apparatus
11 Passenger recording apparatus
12 Vehicle-internal analytical apparatus
13 Communication interface
14 Vehicle-external apparatus
15 Data memory
16 Evaluation apparatus The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for monitoring at least one passenger of a vehicle comprising:
   outputting informational content in the vehicle, which informational content is perceptible to the at least one passenger;
   in response to outputting the informational content, determining or accessing recognition data associated with the informational content, which recognition data includes at least one keyword included in or otherwise associated with the informational content;
   in response to outputting the informational content:
     recording a conversation in the interior of the vehicle using a microphone in the interior of the vehicle during one or more of a time interval while the informational content is being output, and a time interval after the informational content is being output;
       performing a conversation analysis of the recorded conversation, identifying at least one instance of the at least one keyword in the recorded conversation; and
       based on the conversation analysis, detecting the output informational content was perceived by the at least one passenger of the vehicle;
     determining a passenger mood or a level of passenger positivity associated with the output informational content based on at least one of (a) the recorded conversation and (b) images recorded by a camera in the interior of the vehicle; and
   generate a data record indicating (a) the detection of the output informational content being perceived by the at least one passenger and (b) the determined passenger mood or level of passenger positivity associated with the output informational content.

2. The method of claim 1, wherein the informational content is advertising content.

3. The method of claim 1, wherein the informational content is output visually and/or auditorily in the interior of the vehicle and/or in the traffic space outside of the vehicle.

4. The method of claim 1, wherein the recognition data are determined by analyzing informational content.

5. The method of claim 1, further comprising:
   detecting a device which outputs the informational content;
   transmitting data for identifying the detected device to a vehicle-external circuit;
   by using the data for identifying the detected device, detecting by the vehicle-external circuit the recognition data on the informational contents output by the device; and
   transmitting the detected recognition data by the vehicle-external circuit to the vehicle.

6. The method of claim 5, further comprising:
   recording setting data of a setting of the device that outputs the informational content, and/or of the point in time or the time interval of the outputting of the informational content;
   transmitting the setting data to the vehicle-external circuit; and
   detecting, by the vehicle-external circuit using the setting data, the recognition data on the informational contents output by the device.

7. The method of claim 6, wherein
   the device is a radio, and the setting data indicate which radio station is outputting the informational content, and
   the vehicle-external circuit detects which informational content was output at which point in time or time interval by the radio station, and which acoustic recognition data the output contained.

8. The method of claim 1, wherein the recognition data comprise one or more keywords of the output informational content.

9. The method of claim 8, wherein the analysis of the recorded conversation detects whether there is a correspondence between at least a subset of the one or more keywords belonging to the informational content and words of the conversation.

10. The method of claim 1, comprising detecting personal features of the at least one passenger.

11. The method of claim 1, comprising recording, by a vehicle-internal analytical circuit, which informational content was perceived, and/or which informational content in the vehicle was perceived by which passenger when, and/or which metadata are contained in the informational content, and/or which personal features and/or which mood the passenger had who perceived the informational content.

12. The method of claim 1, comprising transmitting the data record to a vehicle-external evaluation circuit.

13. The method of claim 1, comprising receiving, by a vehicle-external evaluation circuit, the transmitted data from a plurality of vehicles and detecting how informational content belonging to metadata is perceived, and/or determining the effectiveness of outputting the informational content.

14. A device for monitoring at least one passenger of a vehicle, wherein the device comprises:
   an output, configured to output informational content in the vehicle, which informational content is perceptible to the at least one passenger;
   a microphone that is arranged in the interior of the vehicle and is configured to record a conversation in the interior of the vehicle during one or more of a time interval while the informational content is being output and a time interval after the informational content is being output; and
   an analytical circuit that is coupled to the microphone and is configured to:
     determine or access recognition data associated with the informational content, the recognition data including at least one keyword included in or otherwise associated with the informational content;
     analyze a conversation recorded by the microphone to detect at least one instance of the at least one keyword in the recorded conversation;
     determine, based on the detected at least one instance of the at least one keyword in the recorded conversation, the output informational content was perceived by the at least one passenger of the vehicle;

determine a passenger mood or a level of passenger positivity associated with the output informational content based on at least one of (a) the recorded conversation and (b) images recorded by a camera in the interior of the vehicle; and generate a data record indicating (a) the detection of the output informational content being perceived by the at least one passenger and (b) the determined passenger mood or level of passenger positivity associated with the output informational content.

15. The method of claim 2, wherein the informational content is output visually and/or auditorily in the interior of the vehicle and/or in the traffic space outside of the vehicle.

16. The method of claim 2, wherein the recognition data are determined by analyzing the informational content.

17. The method of claim 3, wherein the recognition data are determined by analyzing the informational content.

18. The method of claim 2, further comprising:

detecting a device which outputs the informational content;

transmitting data for identifying the detected device to a vehicle-external circuit;

by using the data for identifying the detected device, detecting by the vehicle-external circuit the recognition data on the informational contents output by the device; and transmitting the detected recognition data by the vehicle-external circuit to the vehicle.

19. The method of claim 3, further comprising:

detecting a device which outputs the informational content;

transmitting data for identifying the detected device to a vehicle-external circuit;

by using the data for identifying the detected device, detecting by the vehicle-external circuit the recognition data on the informational contents output by the device; and transmitting the detected recognition data by the vehicle-external circuit to the vehicle.

20. A method for monitoring at least one passenger of a vehicle comprising:

outputting informational content in the vehicle, which informational content is perceptible to the at least one passenger;

recording, by a recording system provided in the vehicle, the informational content output in the vehicle;

determining, based on the informational content recorded by the recording system provided in the vehicle, at least one keyword associated with the informational content;

recording a conversation in the interior of the vehicle using a microphone provided in of the vehicle;

analyzing the recorded conversation to identify at least one instance of the at least one keyword in the recorded conversation;

based on the conversation analysis, detecting whether or not the output informational content was perceived by the at least one passenger; and generating a data record indicating the detection of whether or not the output informational content was perceived by the at least one passenger.

* * * * *